Oct. 10, 1967 A. J. MAURIN ETAL 3,345,819

FOUNDATION STRUCTURE FOR TURBO-ELECTRIC POWER PLANTS

Filed May 26, 1965

7 Sheets-Sheet 1

INVENTORS.
ALEXANDRE J. MAURIN
PHILIPPE DEMONSABLON

BY Buckin & Goldfarb
ATTORNEYS

INVENTORS
ALEXANDRE J. MAURIN
PHILIPPE DEMONSABLON
BY Biskin & Goldfarb
ATTORNEYS

FOUNDATION STRUCTURE FOR TURBO-ELECTRIC POWER PLANTS

Filed May 26, 1965

7 Sheets-Sheet 3

INVENTORS
ALEXANDRE J. MAURIN
PHILIPPE DEMONSABLON
BY [signature]
ATTORNEYS

FOUNDATION STRUCTURE FOR TURBO-ELECTRIC POWER PLANTS

Filed May 26, 1965

INVENTORS
ALEXANDRE J. MAURIN
PHILIPPE DEMONSABLON
BY Brisbin & Goldfarb
ATTORNEYS Oct. 10, 1967 A. J. MAURIN ETAL 3,345,819

FOUNDATION STRUCTURE FOR TURBO-ELECTRIC POWER PLANTS

Filed May 26, 1965

7 Sheets-Sheet 5

INVENTORS
ALEXANDRE J. MAURIN
PHILIPPE DEMONSABLON
By Brisbin & Goldfarb
ATTORNEYS INVENTORS
ALEXANDRE J. MAURIN
PHILIPPE DEMONSABLON
BY
Brobin & Goldfarb
ATTORNEYS INVENTORS
ALEXANDRE J. MAURIN
PHILIPPE DEMONSABLON
By Baskin & Goldsmith
ATTORNEYS

United States Patent Office 3,345,819
Patented Oct. 10, 1967

3,345,819

FOUNDATION STRUCTURE FOR TURBO-ELECTRIC POWER PLANTS

Alexandre J. Maurin, 16 Rue de Varize, Paris 16eme, France, and Philippe Demonsablon, 66 Rue Denfert Rochereau, Boulogne, France Filed May 26, 1965, Ser. No. 458,963
Claims priority, application France, May 28, 1964, 976,269
2 Claims. (Cl. 60—95)

The present invention relates to a shell-foundation comprising a combination foundation and condenser for a turbo-generator assembly.

A purpose of the present invention is to combine in a unitary shell-foundation the supporting structure for a turbo-generator and one or more condenser shells for one or more turbines or turbo-generators having one or more shafts.

The function of steam condensation by one or several condensers linked to the exhaust of low pressure cylinders in turbo-generators using condenesation is well known. The present technical data of condensers realization and installation can be summarized as follows:

As the power of the units increases, there is a corresponding increase in the flow of steam to be condensed. This increase of the flow of steam in conventional thermal power plants can be reduced by a bettering of the yield, particularly through better cycles, while it cannot be reduced in atomic power plants using a lower pressure steam.

Usually the condenser or condensers are erected below the support structure of the turbo-generator assembly directly below the exhausts. The support structure is made of reinforced concrete or of steel beams, or of a combination of concrete structures and steel beams. One drawback of this construction is that the volume available under the support structure does not increase as fast as the volume of steam to be condenesd.

On the contrary, as the basic power grows, the trend is to reduce the basic cube of the machines space, in m.$^3$/kw., and, as a consequence, the height of the support structure is not increased proportionately to the $\sqrt[3]{}$ of the power.

Thus, since the volume of the condenser has grown faster than the cube available to house it, turbo-generator assembly manufacturers have given up the old circular or oval shapes which were in use twenty years or so ago and now use "cigar-box" shapes, better fitted to the cube available, in which a rectangular shell, made of thick steel plate, properly strengthened, is built up between the side frame supports of the foundation, very much like a drawer in a chest.

As an alternative, certain installations feature a device having the shape of an upside down T with two condensers on each side of the foundation. Such an arrangement which obviously shows the search for more satisfactory solutions, have already been utilized but present some drawbacks, in particular the length of the steam circuit is increased and more space is required for the machine room.

Moreover, the trend is to install the stationary point of the turbine cylinders at the center of the low pressure cylinders. This allows to reduce the movements of the low pressure cylinders and, as a consequence, the relative movements between the turbine and the condenser.

On the other hand, the problem of the suspension of condensers, by way of springs or jacks, becoming more and more difficult as the sizes of the turbo-generator assemblies increased, an installation featuring several condensers fixed to the ground and linked to the turbine exhaust through a rubber gasket between turbine and condenser has been utilized.

The present technique utilizing a metallic condenser independent from the turbine support presents much inconvenience, namely the close proximity between the side frame supports of the foundation basement and the condenser walls, makes the job difficult for the design engineers, the workers on the field, the erectors, blacksmiths, and welders and for the operator. These difficulties in erecting and utilizing the condenser increase its cost.

Steel water boxes require steel pipings for water inlet and outlet. Yet such pipings are generally made of concrete tubing, or concrete plus steel sheet (Bonna type), on the longest part of the circuit. It is therefore necessary to use steel couplings which must be protected against corrosion. All this increases the overall cost of the plant.

It is one of the objects of the present invention to overcome these disadvantages by utilizing a suitable prestressed or poststressed concrete construction which combines one or more shells of one or more condensers and water boxes together with the support of the turbo-generator assembly directly below the condensers.

Thus the support structure becomes a shell-foundation constituting the condenser itself.

The present invention relates to certain characteristics of construction and function of the foundation structure. The condenser is fixed and it can therefore be directly linked to the various pipings of incondensables, drains, steam, condensed water and cooling water. The cooling water system can be linked without intermediate metal couplings to the condenser and the inlet and outlet piping can be made of concrete tubing, together with the water boxes.

It is a further advantage of the present invention in that the springs which were necessary in the conventional construction to hold the condenser, and which are very difficult to set, are eliminated.

A yet further advantage of the present invention is that the flexible link between turbine exhaust or exhausts and condenser flange or flanges, which can be made of metal or, still better, of prestressed concrete and thus permanently be bonded to the construction, is made out of a synthetic rubber or any other approriate compound gasket.

In carrying out the present invention, the condenser shell is lined inside so as to protect the concrete, avoid water pollution and insure full tightness. The lining can be made of welded steel sheet or plastic or synthetic rubber or any other appropriate compound. In case of metal lining, the sheet is embedded into the concrete which is to be calculated to resist outside pressure, or the sheet can be a facing for the concrete.

The tube plates are preferably joined to the shell by a flexible link, made for example of lined rubber thereby allowing for a free expansion of the tubes.

Flanges made of steel or of any other appropriate material are provided and properly disposed so as to straighten the tubes and prevent vibrations. Concrete pillars are properly disposed so as to allow for a size reduction of the water boxes doors.

The arrangement according to the present invention has the further object of eliminating practically all of the drawbacks resulting from the prior art assemblies, while also becoming more advantageous with an increase in the basic power of the turbo-generator assembly.

It is the basic concept of the invention that the whole concrete mass constitutes at the same time the foundation of the turbine and the condenser shell, and will be called hereafter the "shell-foundation."

These, together with the various ancillary features, objects and advantages of the invention which will become apparent as the following description proceeds, are attained by this shell-foundation for a turbogenerator assembly, preferred embodiments of which are illustrated in the accompanying drawings, by way of example only, wherein.

Figure 5:
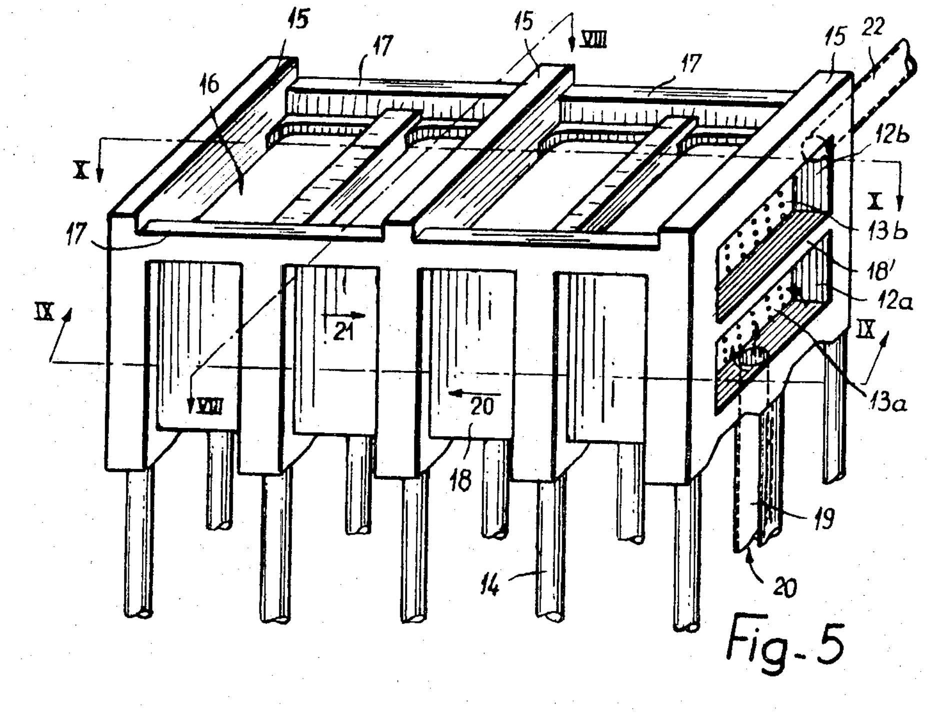
FIG. 5 illustrates details of the shell-foundation embodiment of FIG. 4, without the turbine.
Figures 6, 7:
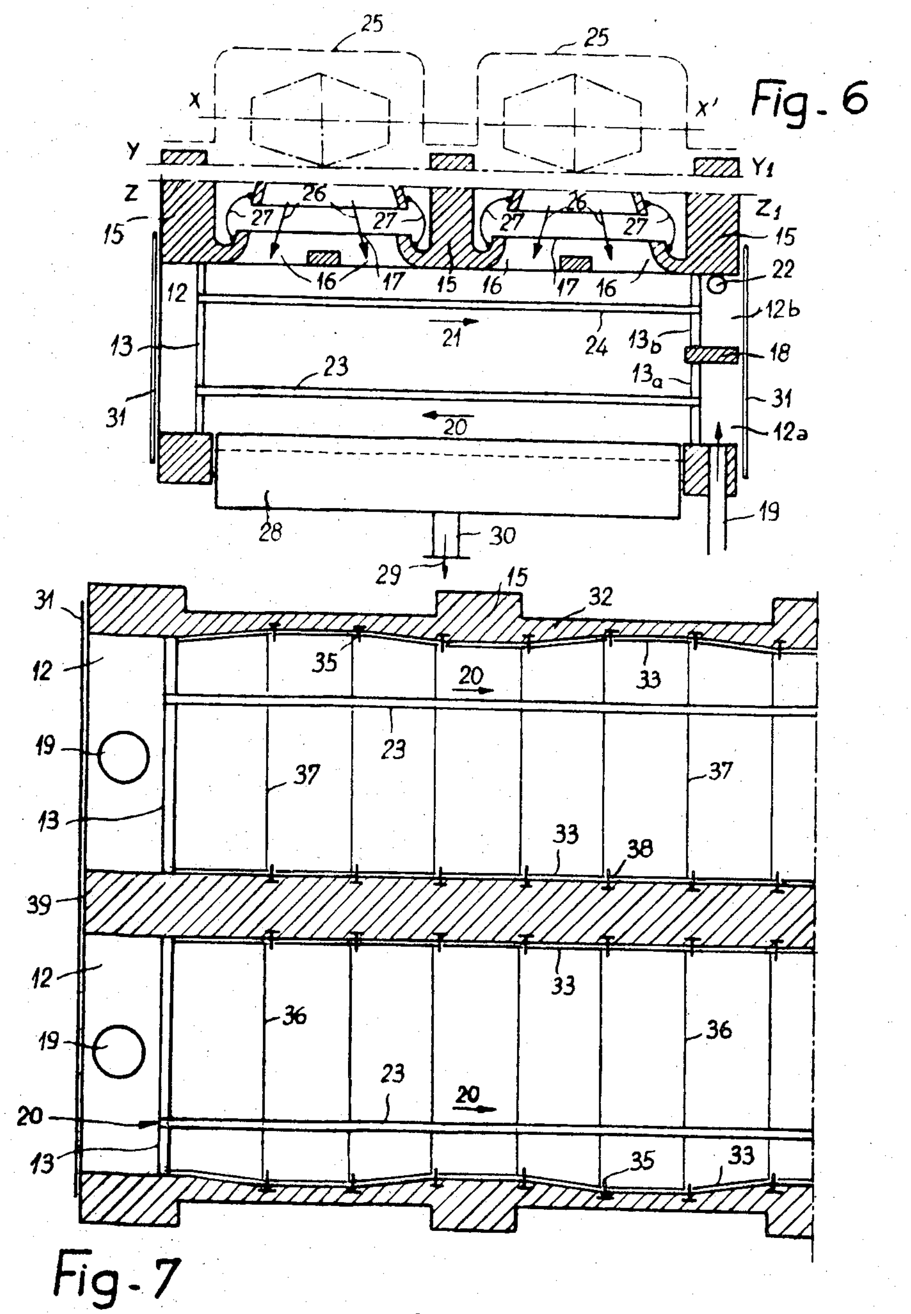
FIG. 6 is a vertical cross-section taken along line VI—VI in FIG. 4.
FIG. 7 is a horizontal cross-section taken along line VII—VII in FIG. 3 and showing how the lining is fixed.
Figure 7A:
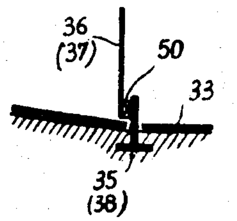
Figure 8:
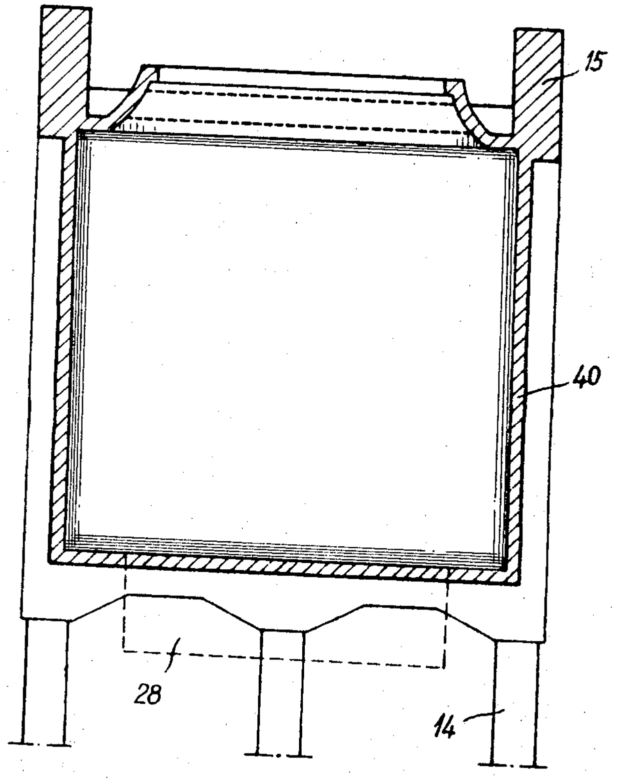
Figure 9:
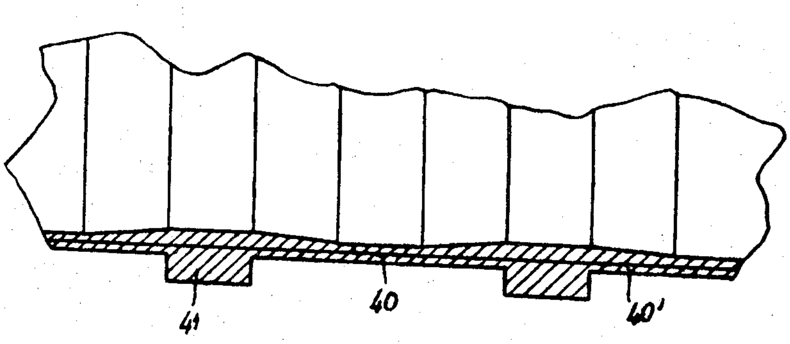
Figure 10:
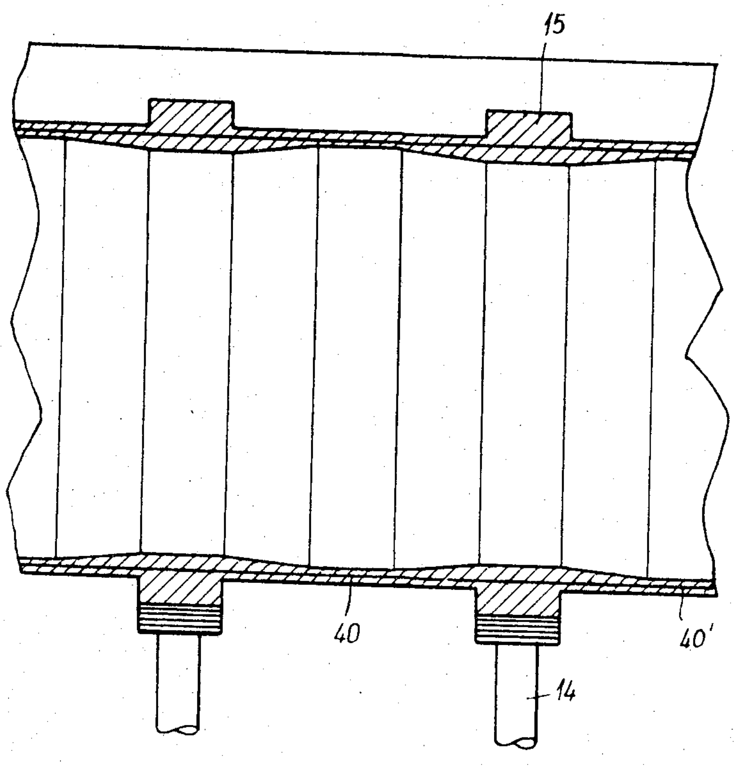
Figure 11:
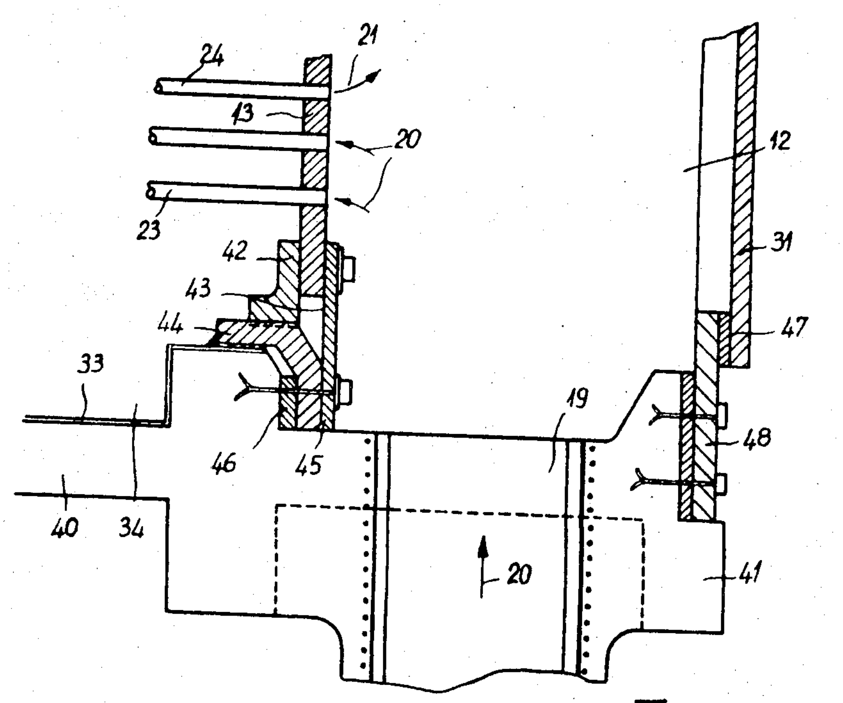
Figure 12:
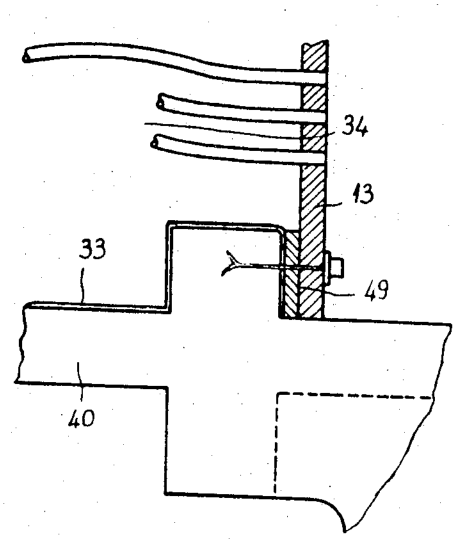

FIG. 7*a* is a vertical sectional view in an enlarged scale showing details of the shell-foundation construction shown in FIG. 7;

FIG. 8 is a cross-sectional view taken along line VIII—VIII in FIG. 5;

FIG. 9 is a cross-sectional view taken along line IX—IX in FIG. 5;

FIG. 10 is a cross-sectional view taken along line X—X in FIG. 5;

FIG. 11 is a detail view showing particularly a water box with straight tubes bundles; and FIG. 12 shows the details of a water box with undulated tube-bundles.

Figure 1:
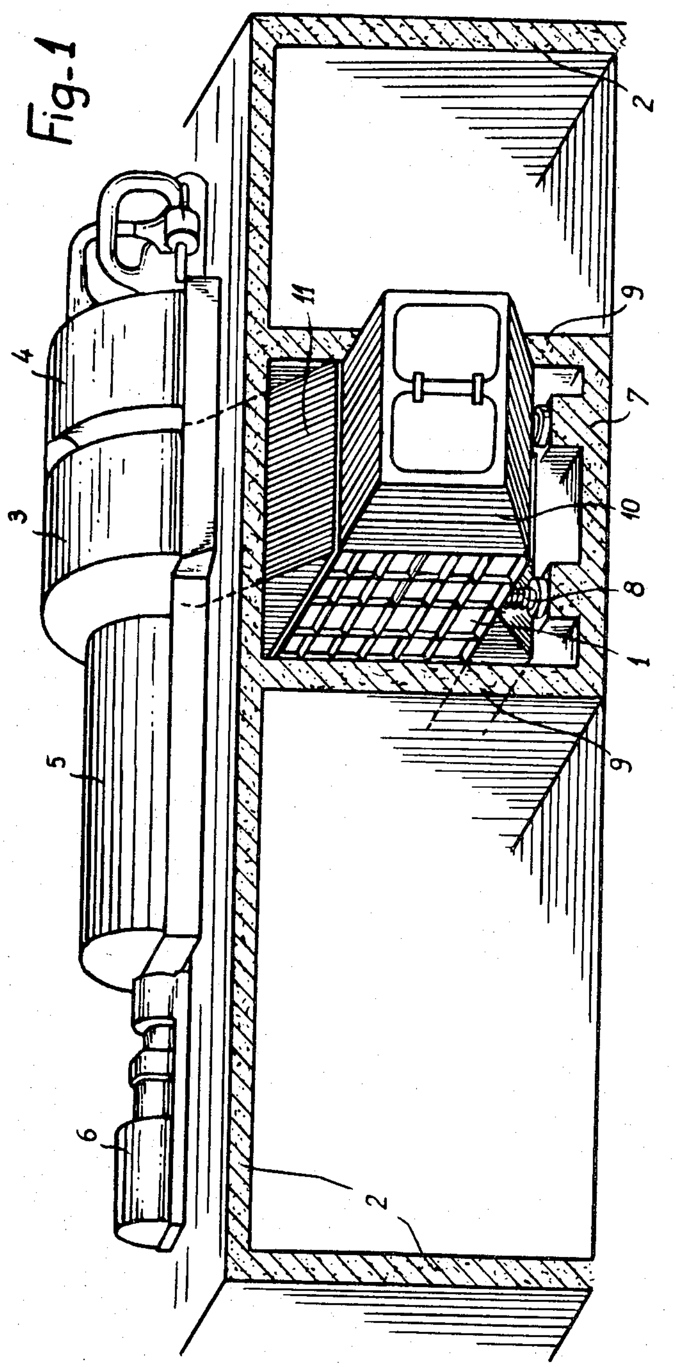
FIG. 1 is a perspective view showing the present technique of a metallic condenser of a one shaft turbine installed crosswise under the turbine held by a concrete foundation. The condenser is separated from the concrete foundation.

With continuing reference to the accompanying drawings wherein like reference numerals designate similar parts through the various veins, in order to explain more clearly the present invention by particular reference to FIG. 1, the characteristics of a conventional condenser installed crosswise under the turbine, through the concrete foundation can be best understood.

In such an assembly, the condenser 1 is separate from the concrete foundation 2 of the turbogenerator group, which consists of a low-pressure cylinder 3, an intermediate-pressure cylinder 4, a generator 5 and an exciter 6. The condenser is disposed crosswise in the concrete foundation and under the turbine. It rests on a base and is supported by springs 8 which are necessary in order to hold the weight and compensate for expansion and contraction. The condenser is fitted between two pillars or vertical walls of the concrete foundation. This condenser is equipped with a water-box 10 and is linked by a steel duct 11 to the low pressure cylinder of the turbo-generator assembly.

Figure 2:
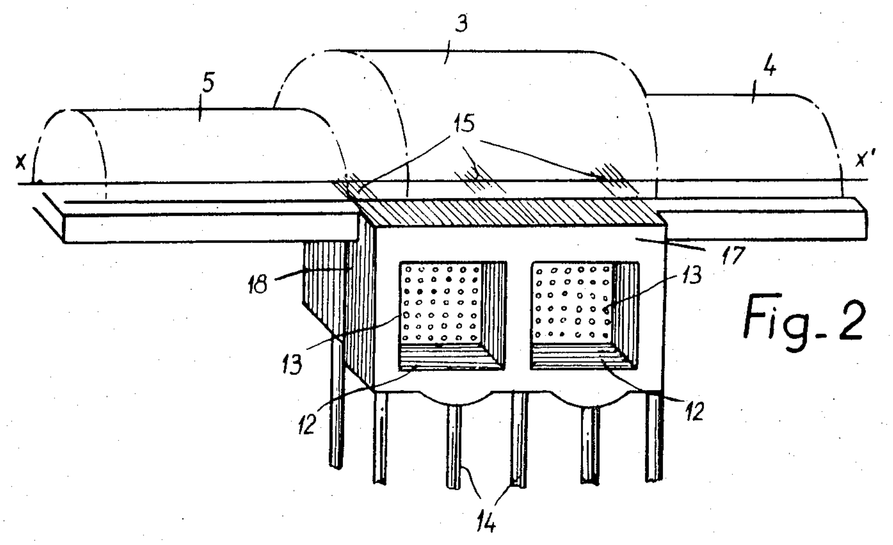
FIG. 2 is a perspective view illustrating an embodiment of the invention including a shell-foundation made of prestressed concrete and disposed transversely under a one-shaft turbine with the condenser water-boxes doors not being illustrated.

In accordance with the concepts of the present invention, there is shown in FIG. 2 an embodiment having a general lay-out similar to the lay-out of FIG. 1, namely crosswise to the axle of the turbo-generator assembly in the latter including a low-pressure cylinder 3, an intermediate-pressure cylinder 4 and a generator 5.

There is no limitation in the fact that the embodiment disclosed employs a one-shaft turbine. The invention can be used for multiple shaft turbines just as well.

According to the present invention, the concrete foundation is built so as to constitute a tight shell which will hold inside and outside pressures and forces and will at the same time transmit to the supporting piles or any other foundation device the whole weight of the turbo-generator assembly.

The structure of the shell-foundation according to the present invention consists of frames 15 disposed crosswise to the axle X–X′ of the turbo-generator as well as lengthwise beams 17 which are walled up as at 18 and rest on piles 14.

At the side ends, the volumes limited by the frame 15 and the beams 17 constitute the water boxes which receive the tube-plates. Also, in the embodiment shown, the frames 15 are the supports of the bearings of the turbo-generator assembly.

Figure 3:
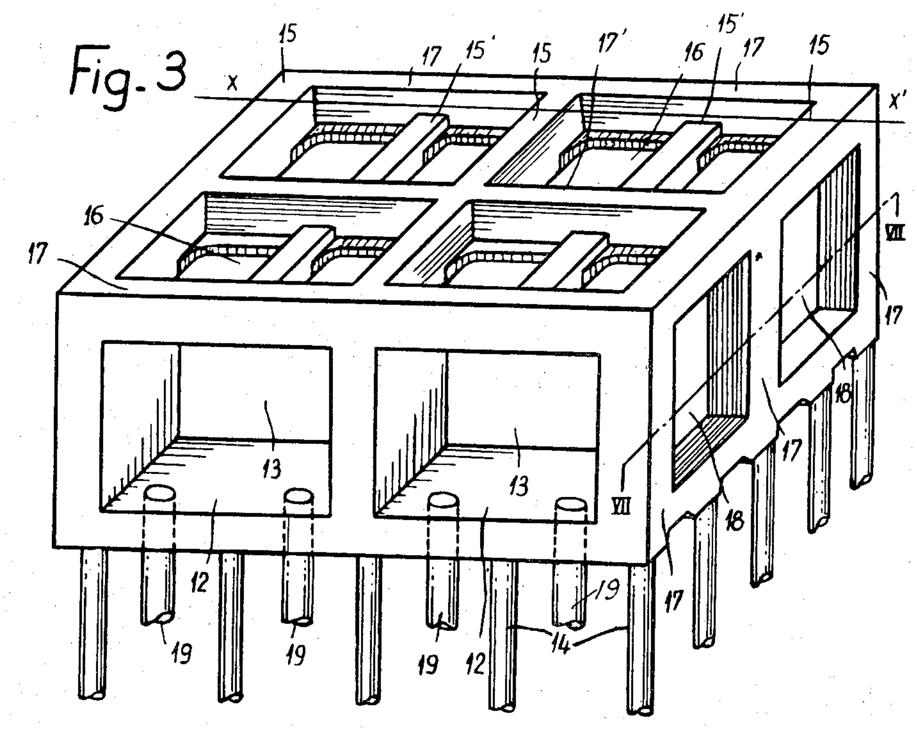
FIG. 3 is a perspective view illustrating the details of the shell-foundation without the turbine.

FIG. 3 shows in more detail the same shell-foundation, but the turbo-generator has been removed. It can be seen that between the beams 17′, crossbars and intermediary beams 15′ and 17′ have been provided for.

At the upper part, the openings 16 between frames, beams and crossbars are used for the steam admission which flows from the low pressure cylinder of the turbine while, on the sides, the walls 18 link frames and crossbars to constitute a tight shell whose ends are obturated by the tubes-plates 13. Cooling water is channeled through pipings 19 flowing into the water boxes 12.

As explained hereinafter, the shell-foundation is lined with a suitable material so as to prevent steam and condensed water to come into direct contact with the concrete.

The number of water boxes and the number of tube bundles in the condenser (in the embodiment shown, two bundles) are in no way limitative.

Figure 4:
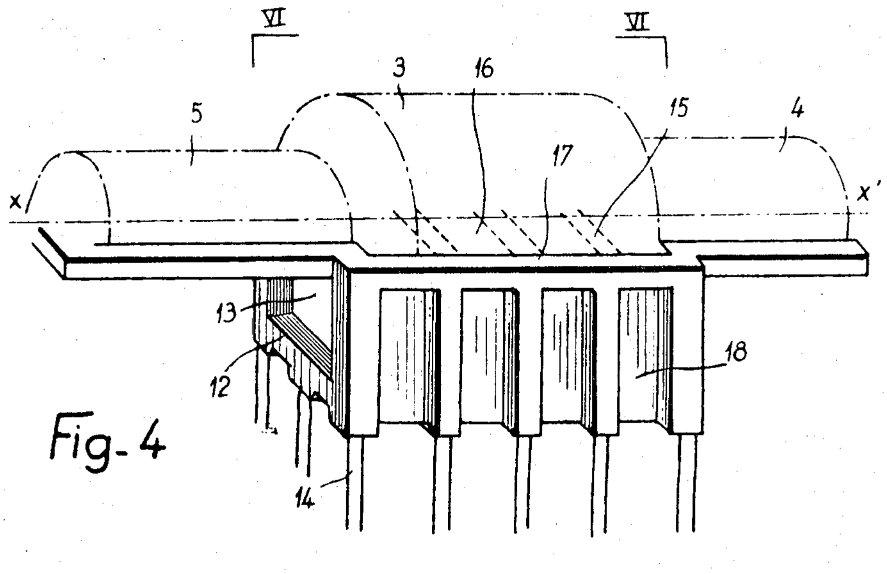
FIG. 4 is a perspective view of a modified form of the invention wherein a shell-foundation made of prestressed concrete is disposed lengthwise under a one-shaft turbine, the condenser water-boxes not being shown.

FIGS. 4 and 5 show an alternative example of shell-foundation disposed lengthwise and featuring one water box only (FIG. 4) at one end, and two water boxes (FIG. 5) at the other end. Shown also are the frames 15, the cross bars 17, walls 18, the upper openings 16 and at the ends, the water boxes 12, **12*a*, 12*b*, with the plates 13. In this embodiment, the frames 15** also support the bearings of the turbine.

The whole assembly is calculated so as to withstand the static charges and eliminate the risks of vibration. This type of concrete construction (prestressed, post-stressed or reinforced concrete) increases the weight and the mass of the foundation of the turbine, thus helping to solve the problem of vibration and resonance of the turbines under operation.

The exhaust flange between the concrete foundation and the turbine consists only in a tight gasket girdling the flange itself of the low pressure cylinder of the turbine so that the convenient vacuum level can be maintained inside the shell and the turbine. This gasket can be made of metal or of any other flexible compound.

FIG. 5 illustrates details of the shell-foundation of FIG. 4, arranged so as to constitute a double pass condenser. The lower half water box **12*a* is separated from the upper half water box 12*b* by a crosswise partitioning 18, with, for instance, a corresponding partitioning of the tubeplate 13 in two parts 13*a* and 13*b*. Water flows into the half waterbox 12*a* through one or several concrete pipes 19** which are directly coupled on the water box walls.

Due to the partitioning 18′ of the vessel, the water goes through the lower half tube bundle, following arrow 20. It then flows into the water box located at the other end of the shell. Pursuing the run, the water flows back through the upper half tube bundle, following arrow 21, and is then driven out of water box **12*b* through a concrete pipe 22** bounded to the foundation.

In FIG. 6, there can be seen the turbine axle X–X', the lower half water box 12*a*, the upper half water box 12*b*, and the half tubeplates 13*a* and 13*b*. At the opposite end there is only one water box and therefore, one tubeplate only is required.

Coming from pipe 19 which flows into the water box 12*a*, the water follows the lower half tube bundle (shown as one tube 23) in the direction of arrow 20, reaches water box 12 and flows back to water box 12*b* through the upper half tube bundle (shown as one tube 24) in the direction of arrow 21. The water is flushed out, after heating through piping 22.

The low pressure cylinder of the turbine 25 resting on frames 15 is shown in phantom lines. The steam runs through the exhaust openings 16 in the direction of arrows 26 and hits the condenser bundles 23 and 24, where it condenses.

The gaskets constituting the intake flange for steam have been sketched in 27. They are set between the exhaust expansion of the turbine, in the one hand, and the divergent nozzles built in or mounted on the beams, on the other hand.

The height of the beams 15, supporting the bearings of the turbine depends on the level difference existing between the turbine axle and the top of the siphon 22. In order to feature this variable height, FIG. 6 has been cut and interrupted between two axles $Y\text{–}Y_7$ and $Z\text{–}Z_7$ drawn in discontinued line. 31 shows the doors obturating the water boxes.

Condensed water is gathered in hot well 28 which can be made of metal or of any appropriate material. Condensed water is pumped out (pumps not shown) and flows out of the condenser through piping 30 following direction of arrow 29. Other pipings for drain, vacuum, condensates are also coupled on the shell. Such pipings are made of metal. They run through the concrete and are welded to the lining.

As explained above, the shell is lined inside. FIGS. 7 to 10 show the details of a metal lining.

FIG. 7 shows the shell wall 32 lined with a steel sheet 33 which has the purposes to both insure the vacuum tightness inside the shell and, further to constitute a formwork when concrete is being poured.

This sheet 33 may be made, for example, of elements welded to T bars 35 whose bases are embedded in concrete. The elements adhere to the concrete by a coating mixed with resins or by inserts.

The intermediary tube flanges 36 and 37 which keep the bundles straight are welded to the T bars 35 and 38 embedded in the internal panel 39 proper to the setup shown in FIG. 5. A joint 50 is provided for between the T bar and the plate so as to absorb expansions and avoid the bending of the plates.

The inner metal lining is used for the fixation of the baffles which support the tube bundles. The recommended spacing of these baffles is from 1.6 to 1.7 m. and this length must be reflected in the concrete structure of the shell, in particular for the length of the thickened parts of the slab, if any, and the spacing of the stiffening frames. This length is recommended in order to avoid the resonance of the tubes in the bundles at 50 or 60 cycles. The spacing of the intermediary flanges should preferably be of the same order.

In the example shown in FIGS. 5, 8, 9 and 10, the structure of the shell-foundation features slabs 40 embodying wires, cables or tendons 40', stretched over the smallest span, and stiffening frames 41 resting on piles 14 or on a concrete footing. These frames 41 are also pre- or poststressed, serving to make sure of prestressing the slabs under crosswire bending moments.

The inner metal lining can be set up after the pouring of the concrete base and thus be used as a formwork for the sides and the top of the concrete shell. The accordion form provided by the variable thickness of the slab, insures the deformations of the lining without buckling.

FIGS. 11 and 12 feature non-limitative examples of the mounting arrangement for the tubes.

FIG. 12 shows straight tubes. In this case, the expansion must be compensated by the movements of the tubeplate in which the tubes 23 and 24 are mounted. To this end, the tubular plate 13 is fixed to a footing 42 and to a flexible membrane 42 made of an appropriate material. Thus, the tube-plate can follow the expansion of the tubes 23 and 24. The footing 42 is fixed to a sliding support 44 welded to the lining 33. Also, the membrane 43 is tied, by tie-rods 45, to the sliding support 44 and to the concrete structures 40 and 41 with interposition of a tight joint 46. Thus, the tube-plate is movable without interfering with the tightness of the shell.

The two pipings (inlet 19 of the cooling water, which could be a Bonna type, and outlet 22, not shown, of the cooling water) are made of concrete and are built in on the water box.

Door 31 features a gasket to insure tightness and both door and gasket are set against a frame 48 embedded into the concrete through a closing device of conventional type which is not shown.

FIG. 12 shows that the tube-plate is tied to the concrete 40, 41 with interposition of a gasket 49 insuring tightness, and which is itself tied to the lining 33. This device is intended to insure complete fluid tightness of the whole shell 34.

The expansion of the tubes, which are undulated or bent, is compensated by increasing the radius of the curves.

As shown by the above description, the purpose and advantages of the present invention are to make the condenser of concrete instead of steel plates, to use this shell-foundation to bear the whole of the low pressure turbines, and to avoid that water should come into contact with concrete by the inside lining of the condenser with a steel sheet or any other appropriate material insuring tightness.

It is recommended that on account of the pressures to be withstood, concrete slabs of prestressed concrete be used for the building of the shell.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

We claim:

1. A shell-foundation in combination with a turbo-generator assembly having an axle and including a low pressure cylinder, an intermediate pressure cylinder and a generator, comprising a poured concrete framework of reinforced concrete including a plurality of frame members including frames extending transverse of said axle and including beams extending normal to and interconnecting said frames, said turbo-generator assembly having bearings, said turbo-generator assembly being disposed entirely on said frames with said frames forming supports for said bearings and supporting the entire weight of said turbo-generator assembly, reinforced concrete wall means interconnecting said frame members and forming with said frame members, a condenser shell so that said frame members serve both to support said assembly and as a part of the condenser shell, said shell having an inner metallic lining, said shell having an open upper part, means at said open upper part for admitting steam flowing from said low pressure cylinder, cooling water circuit means for circulating a coolant for cooling said shell and including cooling water tubes on said shell, tube plates secured to said shell for mounting said tubes, a plurality of intermediary members disposed transverse to said axle for supporting said tubes and said tube plates, and expansion joints provided respectively between said framework, said tube plates, and said intermediate members.

2. A shell foundation according to claim 1, wherein the lower part of said condenser shell includes a hot well provided with draining pipes.

References Cited

UNITED STATES PATENTS

| | | | |
|---|---|---|---|
| 1,733,999 | 10/1929 | Schumarty | 60—95 |
| 2,265,612 | 12/1941 | Ray | 60—95 |
| 2,531,178 | 11/1950 | Van Nest | 60—95 |
| 2,697,790 | 12/1954 | Kirkpatrick | 60—95 |
| 3,074,236 | 1/1963 | Caldwell et al. | 60—95 |
| 3,153,445 | 10/1964 | Huntington | 165—45 |

FOREIGN PATENTS

| | | |
|---|---|---|
| 584,099 | 1/1947 | Great Britain. |
| 123,965 | 4/1959 | Russia. |

ROBERT A. O'LEARY, *Primary Examiner.*

M. A. ANTONAKAS, *Assistant Examiner.*